UNITED STATES PATENT OFFICE.

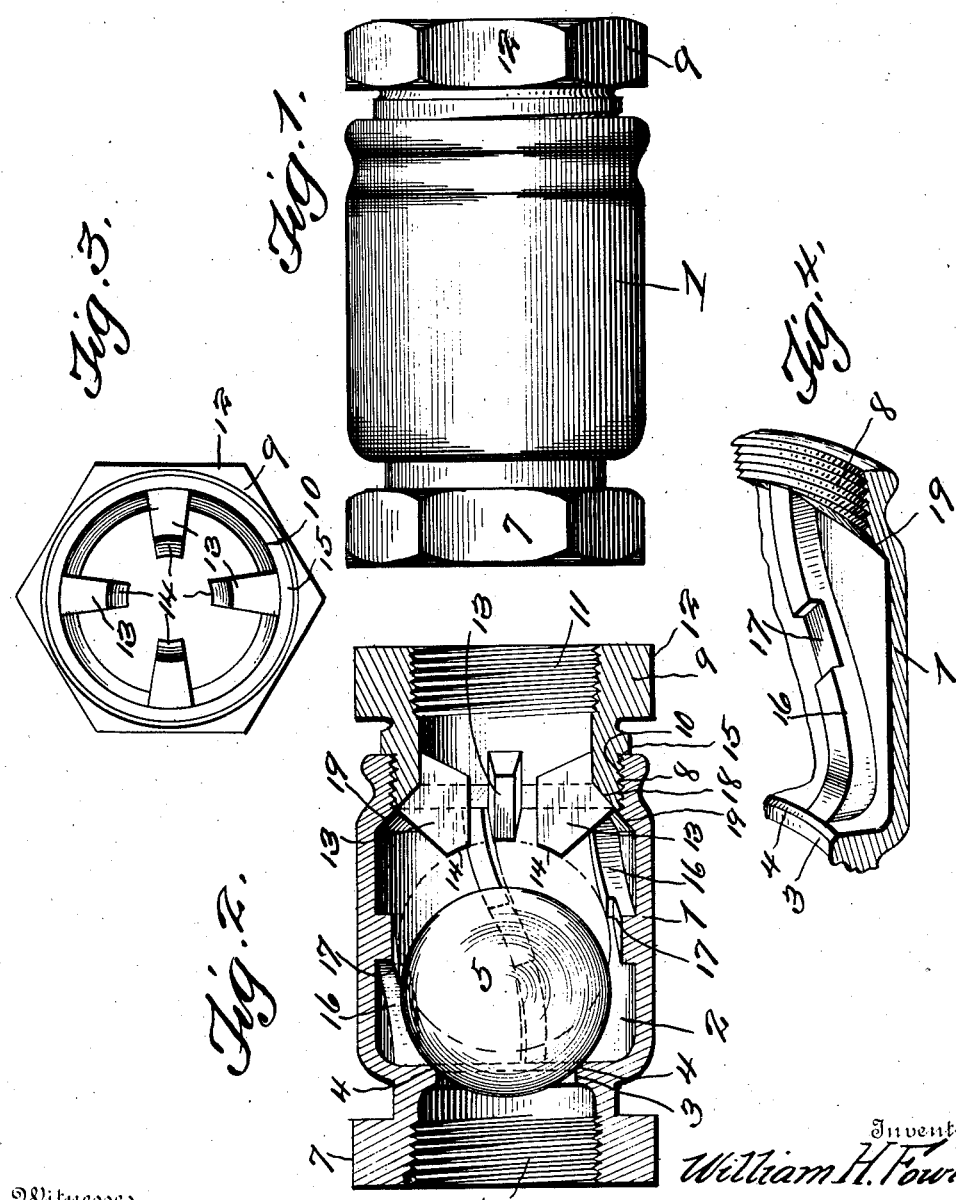

WILLIAM HENRY FOWLER, OF FLOMATON, ALABAMA.

LINE-CHECK.

954,178. Specification of Letters Patent. Patented Apr. 5, 1910.

Application filed October 29, 1909. Serial No. 525,268.

*To all whom it may concern:*

Be it known that I, WILLIAM HENRY FOWLER, a citizen of the United States of America, and resident of Flomaton, in the county of Escambia and State of Alabama, have invented certain new and useful Improvements in Line-Checks, of which the following is a specification.

This invention relates to certain new and useful improvements in line checks for use in connection with injectors and steam boilers, of that general class disclosed in my Patent No. 918,988 granted April 20, 1909.

The present invention has for its objects among others to provide an improved construction whereby the ball will change its position relative to its seat each time the ball is moved from its seat, or actuated, thus producing a self-grinding check.

It has for a further object to provide ribs which serve to guide the ball and also hold it in its coöperative position.

It has for a further object to provide a construction whereby any sediment, iron rust or other corrosive substances will have a clean passage in order to produce a self-cleaning check valve.

I aim further at improvements in the details of construction whereby the cost of manufacture is reduced and the device as a whole, and in its various parts, is materially simplified.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation of my improved construction. Fig. 2 is a substantially central longitudinal section through the same. Fig. 3 is an end view of the reducer removed, showing its lugs. Fig. 4 is a detail of one of the ribs.

Like numerals of reference indicate like parts in the several views.

Referring to the drawings, 1 designates a casing formed with a chamber 2, and at one end with the inner annular flange 3, the inner face of which is beveled, as seen at 4, forming a seat for the ball 5. The extreme end of the casing beyond the flange 3 is interiorly threaded, as at 6, and exteriorly made hexagonal, as seen at 7, for an obvious purpose. The opposite end of the casing is interiorly threaded, as seen at 8, for the adjustable connection therewith of the coupling 9 which is provided with exterior threads 10, for such purpose, the other end of the coupling being interiorly threaded, as at 11, and exteriorly with the hexagonal portion 12, for an obvious purpose. This coupling is formed with the interior lugs 13, as shown, the inner ends of which are beveled, as seen at 14. The coupling is screwed into the end of the main body or casing 1 and is provided with an annular shoulder 15, as seen in Fig. 2, which constitutes a ground joint with the end of the casing.

The main body or casing 1 is formed interiorly with ribs 16 which are arranged spirally and which extend from the screw threads 8 to the seat 4, as will be clearly understood upon reference to Fig. 2. These ribs form guides for the ball 5 to its seat. When the device is put on the injector, the pressure from the injector will cause the ball to roll over a number of times before it hits the front seat. This turning keeps the ball clean.

Each guide rib is cut-away at the center, as seen at 17, so as to allow any scales to pass on by the ball while the injector is working and go on into the boiler. It will be understood that while the injector is working, the ball is seated on the seat 14 of the lugs 13 of the coupling. The check is in position any way it stops on the line of pipe. It is not necessary to employ a strainer, as the construction is such that the ball cannot go into the end of the casing. The lugs provide a water space around the ball. In applying the device, the coupling goes next to the boiler. The check can be placed in any position between the injector and the boiler check.

Upon reference to Fig. 2, it will be noted that the coupling is provided at its inner end with a beveled edge 18 which is coincident with an annular beveled wall 19 at the adjacent end of the casing 1, so that any sediment, iron rust, or other foreign substances will have a clean passage, in order to produce a self-cleaning check valve.

Upon reference to Fig. 2, it will be readily seen that the lugs on the coupling are so arranged that when the discharge of the pump is going in the direction of the arrow in said Fig. 2, the lugs will stop the ball, yet there will be sufficient clearance around the ball, owing to the passages between the lugs. When the ball is forced to the opposite end of the casing, it is seated against the seat 4, preventing any passage in the opposite direction.

Modifications in detail may be resorted to without departing from the spirit of the invention or sacrificing any of its advantages.

What is claimed as new is:—

1. A line check comprising a casing, a ball therein, and spirally disposed guide ribs within said casing extending substantially the entire length thereof and cut away intermediate their ends to form transverse passages.

2. A line check comprising a casing, a ball therein, spirally disposed guide ribs within the casing having transverse passages for the passage of scale, etc., and a coupling engageable in one end of said casing and having inwardly extending lugs.

3. A line ball check comprising a chamber having a seat at one end, longitudinally disposed spiral guide ribs, and a seat for the ball at the opposite end of the casing, said guide ribs being cut-away intermediate their ends.

4. A line check comprising a casing having a seat at one end, longitudinally disposed spiral guide ribs cut away intermediate their ends, a ball mounted for movement within the casing to be guided by said ribs, and a coupling having ribs against which the ball is adapted to be seated, the adjacent portions of said coupling and casing being correspondingly beveled.

5. A line check comprising a casing, a ball movably mounted therein and adapted to be seated at one end, means at the opposite end providing a seat for the ball and a clearance, and means within the casing for guiding the ball and causing it to partially revolve, said last-named means having transverse passages for scale, etc., beneath the ball.

Signed by me at Flomaton, Ala., this 27 day of Oct. 1909.

WILLIAM HENRY FOWLER.

Witnesses:
B. M. TURNER,
T. W. HENDERSON.